United States Patent
Ionita et al.

(10) Patent No.: US 12,312,715 B2
(45) Date of Patent: May 27, 2025

(54) BELT STRAP FOR A SAFETY BELT DEVICE OF A MOTOR VEHICLE

(71) Applicant: Autoliv Development AB, Vargarda (SE)

(72) Inventors: Ioan Ionita, Brasov (RO); Kai-Stephan Mueller, Oelixdorf (DE); Crina Tiron, Brasov (RO); Willi Welz, Veghel (NL); Mihaela Costea, Brasov (RO)

(73) Assignee: AUTOLIV DEVELOPMENT AB, Vargarda (SE)

( * ) Notice: Subject to any disclaimer, the term of this patent is extended or adjusted under 35 U.S.C. 154(b) by 167 days.

(21) Appl. No.: 17/999,506

(22) PCT Filed: Apr. 13, 2021

(86) PCT No.: PCT/EP2021/059522
§ 371 (c)(1),
(2) Date: Nov. 21, 2022

(87) PCT Pub. No.: WO2021/239314
PCT Pub. Date: Dec. 2, 2021

(65) Prior Publication Data
US 2023/0235489 A1    Jul. 27, 2023

(30) Foreign Application Priority Data
May 26, 2020   (DE) .................... 10 2020 206 517.9

(51) Int. Cl.
*D03D 1/00* (2006.01)
*B60R 22/12* (2006.01)
(Continued)

(52) U.S. Cl.
CPC .......... *D03D 1/0005* (2013.01); *B60R 22/12* (2013.01); *D03D 11/02* (2013.01); *D03D 13/004* (2013.01); *D10B 2505/122* (2013.01)

(58) Field of Classification Search
CPC .... D03D 11/02; D03D 1/0005; D03D 13/004; D03D 2505/122; B60R 22/12
See application file for complete search history.

(56) References Cited

U.S. PATENT DOCUMENTS 4,500,578 A * 2/1985 van de Kamp .......... D07B 1/22
428/36.1
5,376,440 A * 12/1994 Koseki ................. D03D 1/0005
297/483
(Continued)

FOREIGN PATENT DOCUMENTS

CN      109398301 A  *  3/2019  ............. B60R 22/48
CN      109591758 A  *  4/2019
(Continued)

*Primary Examiner* — Timothy Wilhelm
(74) *Attorney, Agent, or Firm* — DICKINSON WRIGHT PLLC

(57) ABSTRACT

The invention relates to a belt strap for a safety belt device of a motor vehicle, comprising at least one hollow section which has at least one cavity for receiving electronic components and/or lines, wherein the cavity is formed by two fabric layers and the fabric layers are formed by a plurality of warp threads and weft threads. The fabric layers are connected to each other in the outer edge sections by means of edge weave threads. A single layer section adjoins the at least one hollow section, in which the fabric layers are connected to each other by a plurality of central weave threads, the central weave threads in the hollow section being woven together in only one of the fabric layers.

8 Claims, 3 Drawing Sheets

(51) Int. Cl.
  *D03D 11/02*  (2006.01)
  *D03D 13/00*  (2006.01)

(56) References Cited

U.S. PATENT DOCUMENTS

| | | | | |
|---|---|---|---|---|
| 6,065,775 | A * | 5/2000 | Carter | B60R 21/2342 |
| | | | | 280/743.1 |
| 6,419,263 | B1 * | 7/2002 | Busgen | D03D 1/02 |
| | | | | 139/389 |
| 6,883,555 | B1 * | 4/2005 | Speich | D03D 1/0005 |
| | | | | 139/296 |
| 7,407,181 | B2 * | 8/2008 | Stow | B60R 21/235 |
| | | | | 280/730.2 |
| 8,556,020 | B2 * | 10/2013 | Rodemer | B60R 22/12 |
| | | | | 280/808 |
| 8,622,424 | B2 * | 1/2014 | Finn | B60R 21/235 |
| | | | | 280/743.1 |
| 10,562,484 | B2 * | 2/2020 | Helvoort | D03D 11/02 |
| 11,535,189 | B2 * | 12/2022 | Wang | B60R 22/12 |
| 2002/0067031 | A1 * | 6/2002 | Busgen | B60R 21/272 |
| | | | | 280/743.1 |
| 2002/0074783 | A1 * | 6/2002 | Iseki | B60R 21/18 |
| | | | | 280/733 |
| 2005/0056335 | A1 * | 3/2005 | Tielemans | D03D 1/0005 |
| | | | | 139/383 A |
| 2013/0193727 | A1 | 8/2013 | Rodemer | |
| 2014/0232165 | A1 * | 8/2014 | Brielmann | B60R 22/12 |
| | | | | 139/11 |
| 2015/0265200 | A1 * | 9/2015 | Mahdi | A61B 7/02 |
| | | | | 600/528 |
| 2016/0250987 | A1 * | 9/2016 | Okubo | B60R 22/12 |
| | | | | 280/729 |
| 2017/0341621 | A1 * | 11/2017 | Helvoort | D03D 11/02 |
| 2019/0344743 | A1 * | 11/2019 | Jaradi | B60R 21/231 |
| 2021/0268988 | A1 | 9/2021 | Wang et al. | |
| 2022/0001832 | A1 * | 1/2022 | Rausch | D03D 1/0005 |

FOREIGN PATENT DOCUMENTS

| | | | | |
|---|---|---|---|---|
| CN | 115397702 A | * | 11/2022 | B60R 22/12 |
| DE | 102014004960 A1 | * | 10/2015 | B60R 22/12 |
| DE | 102020109151 A1 | * | 10/2021 | |
| EP | 0928260 B1 | | 2/2003 | |
| EP | 3204543 B1 | * | 7/2019 | B60R 22/14 |
| WO | WO-2014183832 A1 | * | 11/2014 | B60R 21/18 |
| WO | WO-2014195255 A1 | * | 12/2014 | D03D 1/0005 |
| WO | 2020007912 A1 | | 1/2020 | |
| WO | 2020025627 A1 | | 2/2020 | |

* cited by examiner

BELT STRAP FOR A SAFETY BELT DEVICE OF A MOTOR VEHICLE

CROSS-REFERENCE TO RELATED APPLICATIONS

This application is a 35 U.S.C. § 371 national phase of PCT International Application No. PCT/EP2021/059522, filed Apr. 13, 2021, which claims the benefit of priority under 35 U.S.C. § 119 to German Patent Application No. 10 2020 206 517.9, filed May 26, 2020, the contents of which are incorporated herein by reference in its entirety.

FIELD

The present invention relates to a belt strap for a safety belt device of a motor vehicle, having the features of the preamble of claim 1.

BACKGROUND

In general, belt straps in safety belt devices of motor vehicles serve to restrain occupants in motor vehicles in an accident in order to optimally prevent more serious injuries. The safety belt devices have, among other things, a belt retractor fastened in a manner fixed to the vehicle, with a belt spool on which one end of a belt strap can be taken up. The other end of the belt strap can either be locked via a belt tongue in a belt buckle fastened in a manner fixed to the vehicle or is likewise permanently fixed to the vehicle via an end fitting. Insofar as the other end is fastened in a fixed manner to the vehicle via an end fitting, the safety belt device also has a belt tongue, guided displaceably on the belt strap, which can be locked in a belt buckle fixed to the vehicle, e.g. to form a three-point geometry of the belt strap.

Due to their objective of restraining the occupant, the belt straps must themselves meet various requirements in terms of tensile strength, surface finish, edge condition, and the like.

Modern motor vehicles are further equipped with a multitude of electronic components, such as sensors, actuators, monitors, acoustic units, heating and cooling devices etc., whose number is expected to increase even further as motor vehicles become increasingly automated with their drive units, control units, and comfort devices. These devices must be further connected to each other and to corresponding power sources and control devices via electrical lines. Insofar as such electronic components and lines are part of the safety belt device, they must be arranged accordingly at the safety belt device without impairing the use or functionality of the safety belt devices.

It is already known from DE 10 2011 009 318 A1 to provide the belt strap with a hose segment extending in the longitudinal direction of the belt strap, into which hose segment the electronic components can be introduced. More detailed information on how the hose section in the belt strap is manufactured cannot be found in the publication.

SUMMARY

Against this background, the invention is based on the object of providing a belt strap for a safety belt device of a motor vehicle with a cavity for receiving electronic components and lines, which should be as simple as possible in terms of design and additionally be inexpensive to manufacture.

According to the invention, a belt strap having the features of claim 1 is proposed for achieving the object. Further preferred developments are to be learned from the subclaims, Figures, and the accompanying specification.

In accordance with the basic idea of the invention, it is proposed that the cavity formed in a hollow section of the belt strap is formed by two fabric layers that are connected to each other in the outer edge sections by one or more edge weave thread(s) running parallel to the longitudinal direction of the belt strap. This hollow section is not continuous over the entire length of the belt; rather, the hollow section is adjoined by at least one single-layer section. This single-layer section is formed of the same fabric layers as the hollow section, which are respectively continuously woven by a plurality of warp threads and weft threads. The edge weave thread(s) likewise run(s) continuously in both the hollow section and the single-layer section. A plurality of central weave threads running parallel to the longitudinal direction of the belt strap is thereby provided in the central region arranged between the edge sections, which central weave threads connect the fabric layers to each other in the single-layer section and are woven together in only one fabric layer in the hollow section.

Via the achievement according to the invention, the cavity can already be manufactured upon the weaving of the belt strap. In its basic structure, the belt strap is woven in two fabric layers independent of each other, which fabric layers are connected to each other in the hollow region only in the edge sections by means of edge weave threads. In the single-layer section, the fabric layers are connected to each other by the edge weave threads and the central weave threads across the entire width of the belt strap, whereas, in the hollow section, the central weave threads run within one fabric layer and thus can create a cavity between the fabric layers. The connecting threads provided for connecting the two fabric layers can thereby be woven in at the same time upon weaving, so that the connection of the fabric layers is realized directly upon weaving, and there is no need for a further separate work step for connecting the fabric layers. Since the weave threads serve only to connect the two fabric layers, but the tensile forces acting in the event of restraint are, as before, absorbed by the warp threads, it is sufficient if the weave threads are designed and arranged solely from the viewpoint of a reliable connection of the two fabric layers. The yarn thickness of the fabric layers, the yarn thickness of the binding threads, the material of the weave threads, and also the number of weave threads can thereby be used as design parameters for the connection of the fabric layers. In that the entire region of the belt strap is not formed as a hollow section, but rather, for example, a plurality of short hollow sections can also alternate with single-layer sections, a cavity can be provided only in the region of the belt strap in which an electronic functionality is required. This also leads to improved retraction and restraint properties of the safety belt device.

According to the invention, it is proposed that the fabric layers are formed by a plurality of warp threads and weft threads. The warp threads run in the direction of the longitudinal direction of the belt strap and are connected to each other by the weft threads to form the planar fabric. The warp threads thereby form the surfaces of the fabric layers in the finished woven fabric, whereas the weft threads run between the warp threads and cannot be seen from the outside given an accordingly dense fabric. The warp threads are designed to have a corresponding tensile strength and serve to absorb the tensile forces in the longitudinal direction of the belt strap, whereas the weft threads are finer and serve to hold the warp threads together.

It is further proposed that the belt strap has a width of from 40 to 50 mm, preferably from 46 to 48 mm, and that the edge sections in which the fabric layers are connected to each other by the weave threads have a width of respectively at least 2 mm, preferably at least 4 mm. The proposed width of the belt strap corresponds to the standard belt strap width. Via the proposed dimensioning of the edge sections, it can be prevented that the belt strap loses its planar form under the effect of shear forces, and that wrinkles thereby form in the belt strap. In particular, it can thereby be prevented that the belt strap with the two fabric layers twists or warps under lateral unrolling of the edge sections in the longitudinal direction. The width of the edge sections, and the associated planar connection of the fabric layers in the edge sections, can thereby be achieved in particular via a corresponding selection of the number and arrangement of the weave threads.

It is further proposed that the hollow section has a length of 1300 to 1700 mm, and a cavity arranged in the hollow section has a width of 10 to 37 mm. Via the proposed dimensioning of the cavity width, the cavity can be adapted to the employed utilization so that, for example, a cavity for routing electrical lines can be dimensioned very narrowly. According to the standard, a belt strap in a safety belt device for motor vehicles is 3500 mm long. Due to the preferred length range of the hollow section, the belt strap can be given a functionality only in the region in which it is needed.

It is further proposed that a section of the belt strap which is arranged in the region of a deflector or a belt tongue in a safety belt device of a motor vehicle in the worn state, or is to be taken up on a belt retractor after unbuckling, is a single-layer section. The proposed developments lead to improved retraction and restraint properties of the safety belt device. In principle, the single-layer section has the advantage that here no fabric layers are provided that lie on top of each other and can be slid against each other, as is so given the hollow sections. Thus, given the single-layer section, there is a significantly lower probability of the belt strap twisting, and the belt strap can be rolled up on the spool into a substantially more compact, wrinkle-free belt coil. The belt strap also thereby does not tend to form waves in the region of the deflection in the belt tongue and in the region of the deflector given occurring transverse forces. The single-layer section can thereby be formed here in that the belt strap is woven in a single fabric layer in these sections, or in that the two fabric layers in this section are connected to each other in a planar manner by weave threads.

The edge weave thread is thereby preferably woven in a regular weave with the weft threads, for example a 2/2 weave or a 4/4 weave, whereby a uniform connection of the fabric layers with an optimally homogeneous, smooth surface structure can be achieved. A 4/4 weave is thereby to be understood as a weave in which, due to a change of sides in relation to the two sheds of the two fabric layers during weaving, the edge weave thread is always arranged periodically on four successive weft threads on one side and on the following two weft threads on the other side of the belt strap. The respective directly adjacent edge weave threads, or even a plurality of adjacently arranged groups of edge weave threads, can thereby preferably be aligned in such a manner that they are respectively arranged on the opposite sides of the shed, and thus on opposite sides of the weft threads, during weaving. Alternatively, the immediately adjacent edge weave threads can also be respectively offset by one or two weft threads. Thus, due to the connection of the weft threads of the different fabric layers achieved by the weave threads, the warp threads are also indirectly connected by the weave threads, so that a firm bond between the two fabric layers otherwise independent of one another results in the edge sections. In the edge sections, a tight planar connection of the fabric layers is most effective for the planar stabilization of the entire belt strap. In the single-layer section, the weave of the central weave threads with the weft threads of the fabric layers can deviate from the especially stabilizing weaves of the edge weave threads, but likewise has a connecting, stabilizing surface effect.

The central weave threads in the region of the cavity in the hollow section within one of the fabric layers are further preferably woven with the same weave as the warp threads belonging to the fabric layer. The fabric layers thereby continuously transition from the single-layer section into the hollow section, without exhibiting any alteration in the look and feel of the surface in the region of the cavity. The central weave threads thereby change from a weave which guides the central weave threads through both fabric layers, for the purpose of connection, to a single-layer weave. In contrast to the edge weave threads and the warp threads, the central weave threads run discontinuously at the section transition and have both a different periodicity and a different weave depth, two-layer or single-layer, in the single-layer sections and hollow sections.

It is further proposed that the warp threads are connected to the weft threads in a 7/1 weave. Following the above definition of the weave of an edge weave thread, a 7/1 weave is understood as a weave of the warp threads with the weft threads in which the warp threads are arranged in a periodic sequence during seven successive weft threads on one side of the shed of a fabric layer, that they change the side of the shed for a subsequent weft thread before they are again arranged on the other side of the shed for the repetition of the sequence for the next seven weft threads. A surface optimized with respect to haptics and friction can be achieved via the proposed weave of the warp and weft threads. Respective fabric layers can thereby also be achieved which can be particularly well connected to each other by the weave thread with the proposed weave, forming a cavity.

In the hollow region, the two fabric layers may be further connected to each other in one or more central sections arranged between the edge sections, forming two or more cavities separated from each other. Via the proposed additional connecting sections, on the one hand the connection of the fabric layers can be further improved, and on the other hand, a plurality of cavities separated from each other can be achieved, e.g. for the purpose of a deliberately separate routing of lines or a separate arrangement of electrical components. In a preferred embodiment, the hollow region can comprise two cavities running in parallel in the longitudinal direction of the belt strap; the connecting region of the fabric layers formed between these two cavities is realized by a portion of the central weave threads which here do not run with the weave of the warp threads in only one fabric layer, but rather further connect the two fabric layers with each other as in the single-layer section. The two cavities thereby preferably have a width of 10 to 18.5 mm, respectively. A further embodiment comprises three cavities running in parallel which, given identical dimensioning, respectively have a width of 10 to 12 mm. In principle, further embodiments with additional cavities, for example four or five cavities, are also conceivable, but the total width of the plurality of cavities running in parallel should not exceed the preferred maximum width of a single cavity of 37 mm, so that the edge sections still have sufficient width for planar stabilization of the entire belt strap. Given a higher number of cavities running in parallel, the usable space of the individual cavities also becomes increasingly smaller and thus ineffective, especially since the more numerous connecting regions between the cavities are not also available for use.

BRIEF DESCRIPTION OF THE DRAWINGS

The invention is explained below using preferred embodiments with reference to accompanying Figures. The following are shown.

DETAILED DESCRIPTION

Figure 1:
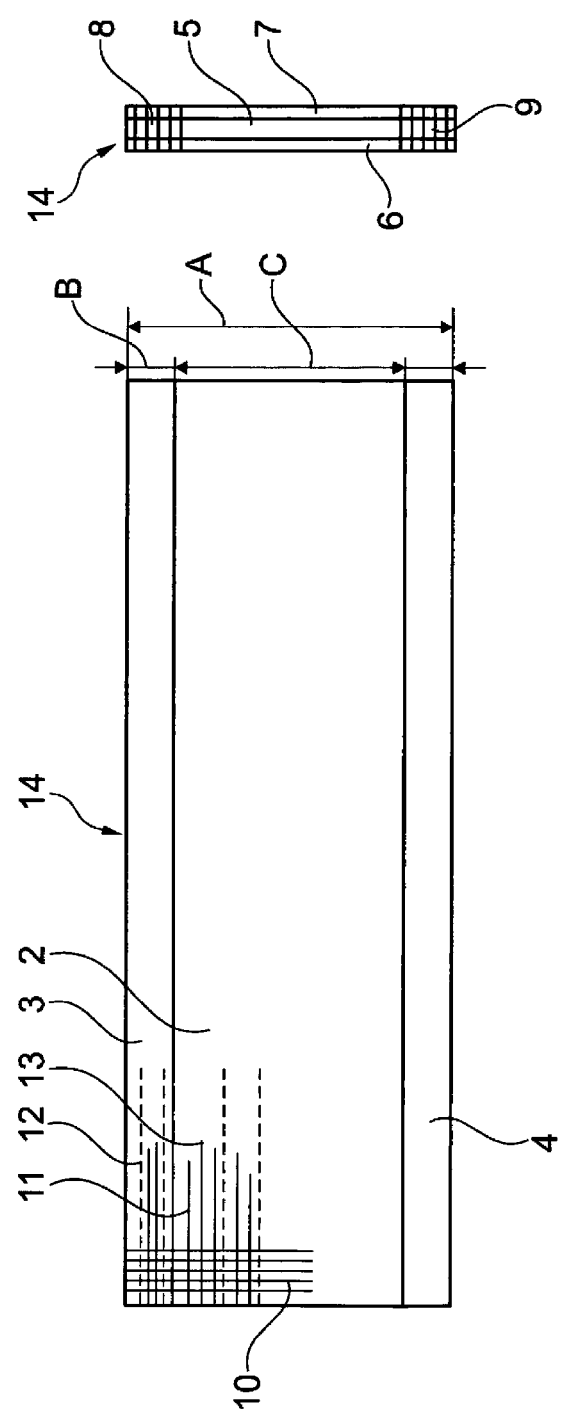
FIG. 1 a belt strap according to the invention in plan view and section illustration.

In FIG. 1, the hollow section 14 of a belt strap 1 according to the invention is visible in plan view and in the right-hand illustration in sectional view. The belt strap 1 has two fabric layers 6 and 7 which are not connected to each other in a central section 2 and are connected to each other in two outer edge sections 3 and 4. The belt strap 1 further has a width A of 46 to 48 mm, whereas the edge sections 3 and 4 respectively have a width B of 2 mm, preferably 4 mm.

The belt strap 1 has a plurality of warp threads 11 running in the longitudinal direction of the belt strap 1 which are woven with weft threads 10 running perpendicular thereto to form the fabric layers 6 and 7. Each of the fabric layers 6 and 7 thereby has warp threads 11 and weft threads 10 separate from each other, so that they form fabric layers 6 and 7 independent of one another. The fabric layers 6 and 7 are connected to each other in the edge sections 3 and 4, as will be described in the following, so that a cavity 5 is formed between the fabric layers 6 and 7, which cavity is delimited toward the edge sides by the connection in the edge sections 3 and 4. Electrical lines or additional electronic components, such as smaller control or storage units, simple switches, acoustic playback devices, heating devices, or the like can be arranged in the cavity 5.

The two fabric layers 6 and 7 are woven together by edge weave threads 12 provided in the edge sections 3 and 4, which form connecting sections 8 and 9 of the fabric layers 6 and 7 in the edge sections 3 and 4. The edge weave threads 12 need not be provided across the entire width of the edge sections 3 and 4. Insofar as, for example, a special weave is provided in the region of the edge of the belt strap 1 to realize the softest possible edge, the edge weave threads 12 in the outer edge regions of the edge sections 3 and 4 may also be omitted, insofar as this is not disadvantageous for the connection of the fabric layers 6 and 7. Central weave threads 13 are provided in the central region 2, but in the hollow region 14 shown here they do not contribute to the connection of the fabric layers 6 and 7, rather are woven only within a fabric layer 6 or 7 to realize the formation of a cavity 5.

The width B of the edge sections 3 and 4 is deliberately selected to be 2 mm so that the connection in the edge sections 3 and 4 imposes a planar form on the entire belt strap 1. This effect can thereby be further increased in that the width of the edge sections 3 and 4 is chosen to be even greater, e.g. with a width B of 4 mm or even greater. It is thereby prevented that the belt strap 1 twists or distorts about its longitudinal axis given the action of transverse forces upon an unrolling of the edges of the edge sections 3 and 4. Insofar as is reasonable, the edge sections 3 and 4 can also be dimensioned even larger in the width B, whereby the size of the cavity 5 is reduced, however. This can be reasonable, for example, if the cavity 5 is to be deliberately realized more narrowly, in the form of a channel, whereby the arrangement and course of the lines in the belt strap 1 can be predetermined or defined.

Figure 2A:
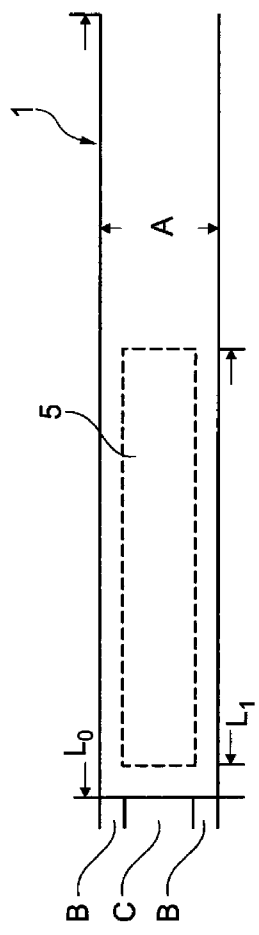
FIG. 2 a schematic illustration of the dimensions of a belt strap according to the invention with one, two, and three cavities running in parallel.
Figure 2B:
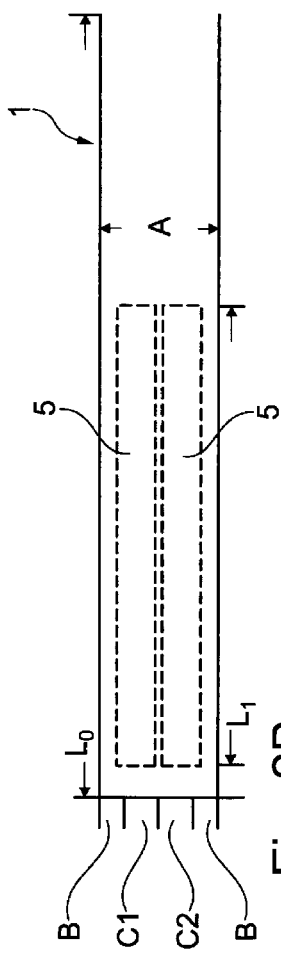
Figure 2C:
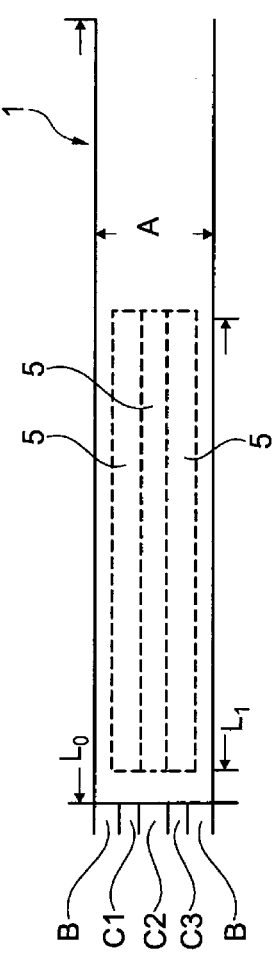

Shown in FIG. 2 are the dimensions of the belt strap for various hollow sections 14. The total length L0 of a belt strap of a typical 3-point safety belt device for motor vehicles is normally 3500 mm. The width A of the entire belt strap 1 is preferably 46 to 48 mm. The total width of the cavity 5 in FIG. 2a is preferably a maximum of 37 mm, in order to keep sufficiently large edge regions 3, 4 free, which ensures a planar form of the entire belt strap 1. Therefore, the two cavities 5 running in parallel in FIG. 2b also have a width C1, C2 of preferably 10 to 18.5 mm each, and the three cavities 5 running in parallel in FIG. 2c have a width C1, C2, C3 of preferably 10 to 12 mm, respectively. The length L1 of the shown hollow section 14, or of the cavities 5, is preferably 1300 to 1700 mm. However, respectively only one hollow section 14 is shown. However, yet more hollow sections 14 which are interrupted by single-layer sections 15 may be provided along the entire length L0 of the belt strap 1. It is thus conceivable, particularly given a 3-point belt geometry, that, when the safety belt is worn, hollow sections 14 are provided only in the chest region and in the hip region, but not in the region of the displaceable belt tongue when this is anchored in the belt buckle, and in particular not in the region of the belt retractor and the restraint device. In these regions, the arrangement of single-layer sections 15 is more advantageous. It is also advantageous if the hollow sections 14 or the hollow section is or are designed and arranged in such a manner that the belt strap 1 is formed as a single-layer section 15 in the region where it passes through a deflector fixed to the vehicle. The advantage of such solutions can be seen in the fact that the probability that the belt strap 1 thereby twists in the region of the displaceable belt tongue or in the region of the passage through the deflector fixed to the vehicle can be reduced. In principle, given the hollow sections 14 there is the risk that the two fabric layers, break away from one another and thus distort given the action of shear or transverse forces. This effect can be reduced in the proposed regions by specifically forming the belt strap 1 as a single-layer section 15. The proposed regions are thereby inasmuch preferably selected, since here the probability of the occurrence of transverse forces is particularly high (deflector, belt tongue), or a torsion is of particular disadvantage (belt retractor, deflector, and belt tongue).

Figure 3:
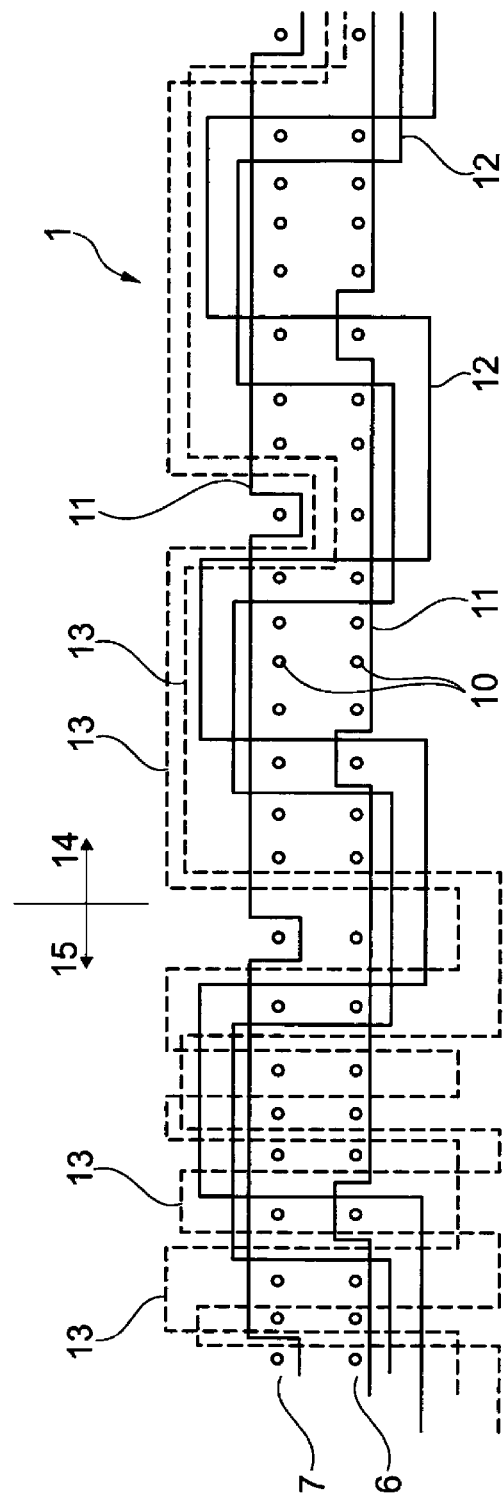
FIG. 3 a longitudinal section through the fabric layers of a belt strap in an enlarged, exploded illustration.

The belt strap 1 is visible in section in FIG. 3. The two fabric layers 6 and 7 are woven in a 7/1 weave. The change of warp threads 11 from one side to the other side of the shed in the loom of a fabric layer 6 or 7 is selected so that they are first arranged in a periodic sequence on one side of the shed while seven weft threads 10 are shot through the shed. The warp threads 11 then change to the other side of the shed for the weft for the shooting of a next weft thread 10, before changing back to the other side of the shed to repeat the weaving rhythm for the subsequent seven weft threads 10 of the next period. This results in a rhythm with seven respective weft threads 10 covering the warp threads 11 towards one side, and then a weft thread 10 covering the warp threads 11 at the other side, before the rhythm is repeated. The warp threads 11 of a fabric layer 6 and 7 are woven in bundles (multifilaments) or individually as monofilaments. A first bundle of warp threads 11 is thereby woven in the described rhythm while an adjacent, second bundle of warp threads 11 is woven in an identical but offset rhythm. The warp threads 11 of the two different fabric layers 6 and 7 are further woven in the same described weaving rhythm, but in a manner offset from each other, as can be seen in FIG. 3.

Instead of the described 7/1 weave, a 5/1/1 weave or a 3/1 weave or a 5/1/1/1 weave would also be conceivable, wherein, in principle, weft threads 10 of a yarn count of 100 to 1100 dtex can be used as monofilaments or multifilaments.

The two fabric layers 6 and 7 woven separately from each other in this manner are connected to each other by at least one edge weave thread 12 in the illustrated edge section 3. The edge weave thread 12 is woven in a 4/4 weave with the weft threads 10 of the two fabric layers 6 and 7, i.e. the edge weave thread 12 is guided for four weft threads 10 of the two fabric layers 6 and 7 on one side of the shed of one of the fabric layers 6 or 7 and then changes to the opposite side of the shed of the other fabric layer 6 or 7.

In the finished woven belt strap 1, the edge weave thread 12 thus runs periodically for four weft threads 10 on the underside of the lower fabric layer 6 in the illustration, and for the next four weft threads 10 on the upper side of the upper fabric layer 7 shown in the illustration. It thus runs, periodically alternating, on the two free surfaces of the fabric layers 6 and 7 and thereby changes sides in that it passes through the weft threads 10 of both fabric layers 6 and 7 to the other free surface. The edge weave threads 12 thereby run continuously both in the single-layer section 15, in which the two fabric layers 6 and 7 are connected over the entire surface of the belt strap to form a single overall fabric layer, and in the hollow section 14, in which a cavity 5 is provided. The edge weave thread 12 can also be woven in bundles as multifilaments, wherein multiple bundles or individual edge weave threads 12 may moreover be provided which may respectively be woven offset from one another. This is particularly reasonable for realizing the width B of the edge sections 3 and 4 in order to simultaneously realize a correspondingly planar form of the edge sections 3 and 4 with the width B.

Likewise visible in FIG. 3 are the central weave threads 13 that, in the single-layer section 15 shown in the left region, connect the two fabric layers 6 and 7 to each other in a 2/1/1/1/2 weave. The central weave threads 13 therefore run periodically, initially respectively alternating on both free surfaces of the fabric layers 6 and 7, and thereby change sides in that they pass through the weft threads 10 of the two fabric layers 6 and 7 to the other free surface. At the transition from the single-layer section 15 to the hollow section 14 shown on the right side, the periodic weave pattern of the central weave threads 13 is interrupted and discontinuously transitioned into a new periodic weave pattern, which is now woven in only one fabric layer 6 or 7 and preferably corresponds to the periodic weave of the warp threads 11; in the shown embodiment this is a 7/1 weave.

In principle, the weave threads 12, 13 may differ from the warp threads 11 in the material, yarn thickness, color, elongation, and various other properties, since in principle they have a different task than the warp threads 11 to realize the connection. The weave threads 12, 13, for example, do not need to absorb any tensile forces under load, so that they can be formed from a yarn with a lower yarn thickness than the warp threads 11.

In the illustration of FIG. 3, the fabric layers 6 and 7, in the progression the warp threads 11, the weft threads 10, and the weave threads 12, 13, have been pulled apart, with weft threads 10 of the two fabric layers 6 and 7 respectively arranged in one plane so that the weaving pattern is better apparent. However, in the finished belt strap 1, the warp threads 11, the weft threads 10, and the weave threads 12, 13 are considerably more densely present together in a planar weave, wherein on the order of 10 to 15 weft threads per cm of the length of the belt strap 1 may be provided.

While the above description constitutes the preferred embodiment of the present invention, it will be appreciated that the invention is susceptible to modification, variation and change without departing from the proper scope and fair meaning of the accompanying claims.

The invention claimed is:

1. A belt strap for a safety belt device of a motor vehicle, comprising
at least one hollow section which has at least one cavity for receiving electronic components and/or lines, wherein
the at least one cavity is formed by two fabric layers,
the two fabric layers are formed by a plurality of warp threads and weft threads,
the two fabric layers are connected to each other in an outer edge sections by one or more edge weave thread (s) running parallel to a longitudinal direction of the belt strap, wherein
at least one single-layer section adjoins the at least one hollow section in the longitudinal direction of the belt strap, wherein the single-layer section is formed by the two fabric layers, wherein
the two fabric layers in central sections situated between the outer edge sections are connected to each other by a plurality of central weave threads running parallel to the longitudinal direction of the belt strap, and wherein
the plurality of central weave threads in the at least one hollow section are woven together in only one of the two fabric layers.

2. The belt strap according to claim 1, wherein the belt strap has a width (A) of from 40 to 50 mm, and the outer edge sections in which the two fabric layers are connected to each other by the one or more edge weave threads respectively have a width (B) of at least 2 mm.

3. The belt strap according to claim 2, wherein the at least one hollow section has a length of 1300 mm to 1700 mm, and a cavity arranged in the hollow section has a width (C) of 10 to 37 mm.

4. The belt strap according to claim 1, wherein a section of the belt strap, which in the safety belt device of a motor vehicle is arranged in a region of a deflector or a belt tongue or is to be taken up on a belt retractor after unbuckling, is a single-layer section.

5. The belt strap according to claim 1, wherein in the at least one hollow section, the plurality of central weave threads within one of the two fabric layers are woven with a same weave as the warp threads belonging to the one fabric layer.

6. The belt strap according to claim 1, wherein the warp threads are connected to the weft threads in a 7/1 weave.

7. The belt strap according to claim 1, wherein the two fabric layers are connected to each other in two or more hollow sections to form two or more of cavities separated from each other.

8. The belt strap according to claim 1, wherein at least one electrical line and/or one electronic component is arranged in the cavity.

* * * * *